Figure 1:
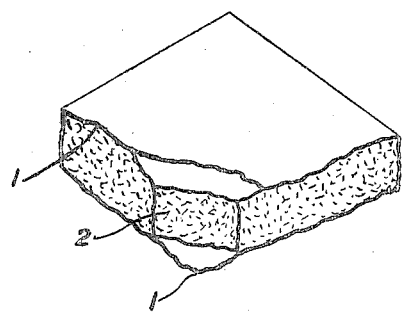

June 5, 1945.   H. DREYFUS ET AL   2,377,846
LIGHT STRUCTURE
Filed Dec. 19, 1941

H. DREYFUS
D. FINLAYSON
W. I. TAYLOR
INVENTORS

Patented June 5, 1945

2,377,846

UNITED STATES PATENT OFFICE 2,377,846

LIGHT STRUCTURE

Henry Dreyfus, London, and Donald Finlayson and William Ivan Taylor, Spondon, near Derby, England, assignors to Celanese Corporation of America, a corporation of Delaware Application December 19, 1941, Serial No. 423,638
In Great Britain December 24, 1940

2 Claims. (Cl. 154—43)

This invention relates to light structures, for example aircraft frames or parts thereof and in particular to the application of plastic materials to such structures.

According to the invention a stress-resisting structural element comprises a body of rigid cellular material of low specific gravity reinforced with stress-resisting members of a material of greater density and strength spaced from one another and located in the stress-resisting element by means of said body of cellular material. The cellular material may constitute nearly the whole bulk of the element and may in this case be suitably shaped and proportioned by moulding or otherwise to the form of the element, which is completed by the addition of other stress-resisting material. Used in conjunction with other stress-resisting materials, and in particular materials of a thickness or shape that itself does not provide rigidity, the cellular material imparts resistance to bending and buckling, and enables the whole structure to be given a very favourable strength/weight ratio. Thus, for example, the cellular material may be used in conjunction with sheet material, metallic or otherwise, having considerable tensile strength but employed under conditions where the tensile stress to be resisted calls for a sheet thickness insufficient to resist compressive stress, so as to provide resistance to compression and to buckling stresses generally. For instance, sheets of the cellular material may be used in conjunction with sheets of aluminium or other light metals or alloys or with fabric-base laminated sheets of the kind described in U. S. application S. No. 412,620, filed September 27, 1941, or with other fabric-base sheets.

The cellular material may be made from a thermoplastic substance as described in U. S. application S. No. 335,262, filed May 15, 1940, i. e., by subjecting a composition of the thermoplastic substance with a relatively small proportion of solvent or latent solvent to heat and pressure and then rapidly releasing pressure so as to allow rapid evaporation of the solvent to expand the mass considerably and produce a body of cellular character. Expanded in this way the thermoplastic material can be given an apparent specific gravity as low as 0.02, although relatively denser products having specific gravities of 0.05, 0.1 or more may be obtained by limiting the amount of expansion that takes place on release of pressure from the heated composition and/or by varying the nature of the composition. As already indicated, the cellular material should be rigid or substantially rigid, this property depending upon the size of the cavities produced by the evaporation of the solvent or latent solvent, this in turn depending upon such conditions as the quantity of solvent originally present and the amount of pressure employed, the rate of extrusion, and the shape and temperature of the mould, if any, used to receive the expanded material.

Among thermoplastic materials organic derivatives of cellulose are particularly suitable for transformation into the cellular articles. Suitable cellulose derivatives are cellulose acetate, propionate, butyrate, aceto-propionate and aceto-butyrate and ethyl, methyl and benzyl cellulose, and, for extreme lightness, hexyl ethyl ether of cellulose and cellulose acetostearate. Other plastic or thermoplastic materials may, however, be employed.

The cellular material may be shaped directly, e. g., by moulding into the form in which it is to be used. When moulded, a fairly smooth and solid skin may be formed on the article which itself augments the rigidity of the article and also assists in the securing of the article by cementing or otherwise to other members, e. g., stress-resisting members intended to be supported against buckling by the moulded article. Slabs or blocks of the cellular material may, however, be cut into suitable shapes and, if desired, secured to other members.

The material to be reinforced may form the actual mould in which the plastic material is expanded. Again, cellular material having a base of thermoplastic material may be brought into intimate contact with metal or other sheets by the application of heat, or of a solvent, with or without pressure, the superficial softening of the cellular material taking place without any material effect on the interior of the cellular material. The cellular material may also be produced in the form of sheets of substantial size and of various thicknesses, especially for the purpose of adding thickness to tension resisting sheets or other materials.

The cellular material may be used in conjunction with reinforced plastic structures of the kind described in U. S. applications S. No. 412,620, filed September 27, 1941, and 409,520, filed September 4, 1941, in which intrinsically strong yarns are formed into fabrics, cords, tubes, etc., so designed as to utilise to the full the high strength of the yarns, and the fabrics etc. are embedded in the plastics. If such a plastic is identical with or compatible with the plastic base of the cellular material, welding of the cellular material and the reinforced material may be effected by heat and/or solvent treatment. Thus, layers of the strong-yarn fabric may be applied to stiffening blocks, slabs, or mouldings of the cellular material preferably with the strong-yarn elements of one layer running at an angle to those of an adjacent layer, and the layers may be impregnated with plastic material (thermosetting or thermoplastic, as desired) so that by heat and pressure treatment the layers may be caused to adhere to each other and to the reinforcing cellular material. Although the cellular nature of the cellular material enables the whole structure to be made exceedingly light, it is advisable to use low density materials in the composite fabric-reinforced skin, and for this purpose cellulose derivatives of low specific gravity such as hexyl ethyl ether of cellulose and cellulose acetostearate may be used as bonding agents for the fabric layers.

Apart from its use as a stiffener, the cellular material imparts buoyancy to the structural material with which it is used, and from this aspect extends the possibility mentioned in U. S. application S. No. 335,262 of enabling aircraft to float if a descent has to be made on water.

Figure 2:
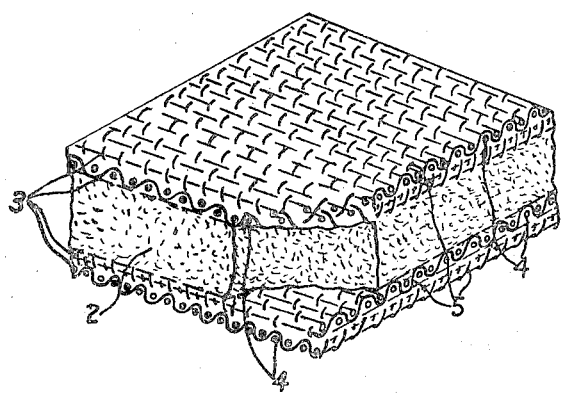
Figure 3:
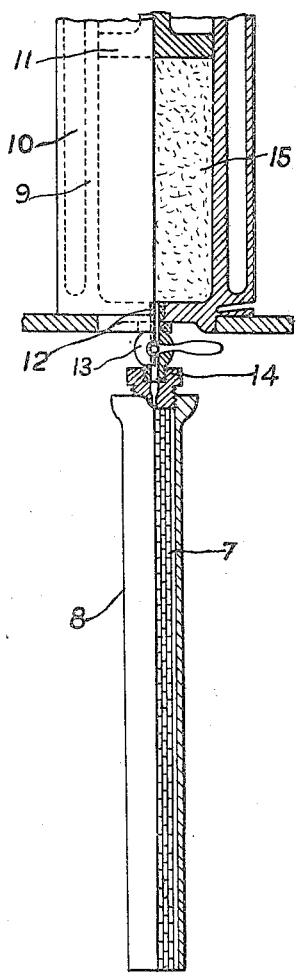
Figure 4:
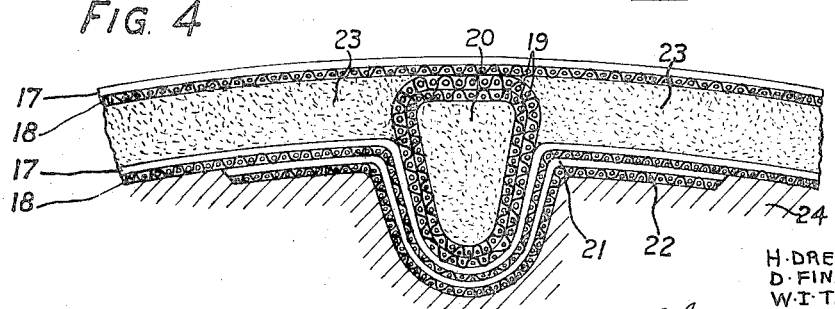

By way of example some forms of stress-resisting element according to the invention will now be described in greater detail with reference to the accompanying drawing, in which Figure 1 is a perspective view of a fragment of reinforced sheet material in which the outer surfaces are formed by metal sheets, Figure 2 is a view similar to Figure 1 of a reinforced sheet material of which the outer surfaces are formed by fabric-base laminated sheets, Figure 3 shows a tubular stress-resisting element in the course of its formation, and Figure 4 is a section of a more complex stress-resisting structure formed in accordance with the invention.

Referring to Figure 1 the counter surfaces 1 of the element shown therein are thin sheets of aluminium or other light metal or alloy, adapted to resist a tensile stress parallel to the plane in which they lie but not in themselves readily able to resist compressive or other buckling stresses. Between the sheets is a thick layer 2 of cellular material of a kind formed in the manner described in U. S. application S. No. 335,262, the layers being secured to one another by the application of a solvent for the substance of the cellular material 2 to the inner surfaces of the metal sheets 1, and lightly pressing the assembly together, the pressure not being sufficiently great to crush the cellular material 2. By these means the sheets 1 are enabled to resist compressive stresses applied in the plane of the sheets and other buckling stresses, being held in position relatively to one another and being prevented from distorting by the interposed layer 2 of cellular material.

The structure shown in Figure 2 is similar to that shown in Figure 1 except that, instead of the metal sheets 1, there is provided, on each side of the layer 2 of cellular material, a double layer of fabrics 3. The fabrics 3 each comprise a set of parallel heavy yarns 4 and a set of parallel light threads 5 forming a warp-and-weft structure, the heavy yarns 4 being substantially straight, while the light threads 5 have the wavy form necessary to interlace with the heavy yarns. The heavy yarns 4 of each of the layers 3 run at right angles to the heavy yarns in the immediately adjacent layer so as to enable the resulting element to withstand tensile stresses applied in any direction parallel to the sheets. The fabrics 3 are united to one another and to the layer 2 of cellular material by the interposition, between each two layers to be united, of a layer of plastic material, the uniting of the assembly being effected by the application of pressure as described with reference to Figure 1, and preferably with the additional aid of heat. Thus, while in the structure shown in Figure 1, the cellular material 2 adheres directly to the metal sheets 1, in the structure shown in Figure 2 there are interposed layers of adhesive material between the fabrics 3, and between the fabrics and the layer 2 of cellular material.

Figure 3 shows the formation of a rod-like stress-resisting element by forming a hollow tube 7 of a fabric of the kind described in connection with Figure 2, enclosing the hollow tube in tubular mould 8, and expanding into the interior of the tube 7 contained in the mould 8 a mass of material adapted to form a cellular structure. This is done by providing a cylinder 9, having a jacket 10 and a plunger 11 fitting in the cylinder. The cylinder has an outlet 12 provided with a cock 13 connected by means of a union 14 to the mould 8. The cylinder 9 is filled with a plastic material 15 comprising approximately 85% of cellulose acetate and 15% of solvent, e. g., acetone. Pressure is applied to the piston 11 and a heating medium is circulated through the jacket 10 and when the material 15 has become sufficiently fluid under the action of the heat and pressure thus applied, the cock 13 is opened so that the material 15 expands into the mould 8 and fills the fabric tube 7.

The more complex structure shown in Figure 4 comprises a fabric skin reinforced by means of an additional stress-resisting member. The fabric skin comprises, on each side, two layers 17, 18 of fabric similar to that described with reference to Figure 2 while the reinforcing rib is in the form of a suitably shaped hollow tube made of two layers of fabric 19. The interior of the hollow tube 19 is filled with cellular material 20 in the manner described with reference to Figure 3 above. The reinforcing member 19, 20 is assembled with the two continuous double layers of fabric 17 and 18, and a further reinforcement in the form of a double strip of similar fabric 21, 22 is added. The two double layers 17, 18 are spaced from one another, and the reinforcing member 19, 20 is held in position by means of two blocks or sheets 23 of cellular material. Between each two adjacent parts of the assembly is disposed a layer of thermoplastic or other adhesive material, in solid form, e. g. as a powder, or in the form of a solution. The whole assembly is united by being pressed, with or without heating, into the moulding member 24 which is shaped to fit the irregular interior of the assembly.

Having described our invention, what we desire to secure by Letters Patent is:

1. A structural element adapted to withstand stress internally developed in a structure in which said element is incorporated, said element comprising a rod-like body of a thermoplastic derivative of cellulose in the form of rigid cellular material of low specific gravity, externally reinforced with a tubular member of laminated sheet material having a fabric base which consists of a set of heavy parallel yarns bound to each other by light threads and in which the heavy yarns of one layer of fabric cross those of another in the laminated sheet, the opposite walls of said tubular member adhering directly to said body and being spaced from one another and located in the structural element by said body of cellular material whereby said cellular material withstands stresses internally developed in said element.

2. A structural element adapted to withstand stress internally developed in a structure in which said element is incorporated, said element comprising a rod-like body of a rigid cellulose acetate in the form of rigid cellular material of low specific gravity, externally reinforced with a tubular member of laminated sheet material having a fabric base which consists of a set of heavy parallel yarns bound to each other by light threads and in which the heavy yarns of one layer of fabric cross those of another in the laminated sheet, the opposite walls of said tubular member adhering directly to said body and being spaced from one another and located in the structural element by said body of cellular material whereby said cellular material withstands stresses internally developed in said element.

HENRY DREYFUS.
DONALD FINLAYSON.
WILLIAM IVAN TAYLOR.